United States Patent [19]

Bernhardt

[11] Patent Number: 5,116,163

[45] Date of Patent: May 26, 1992

[54] ARRANGEMENT FOR DRIVING OUT VOLATILE IMPURITIES FROM GROUND WATER

[75] Inventor: Bruno Bernhardt, Reutlingen, Fed. Rep. of Germany

[73] Assignee: IEG Industrie-Engineering GmbH, Reutlingen, Fed. Rep. of Germany

[21] Appl. No.: 641,683

[22] Filed: Jan. 16, 1991

[30] Foreign Application Priority Data

Jan. 16, 1990 [DE] Fed. Rep. of Germany ....... 4001012

[51] Int. Cl.⁵ .................................................. B09B 1/00
[52] U.S. Cl. ...................................... 405/128; 55/196; 55/385.1; 210/170; 405/258
[58] Field of Search ............... 55/196, 385.1; 210/170, 210/188, 198.1; 405/128, 258, 129; 166/372

[56] References Cited

U.S. PATENT DOCUMENTS

| | | | |
|---|---|---|---|
| 3,887,008 | 6/1975 | Canfield | 166/372 |
| 4,410,041 | 10/1983 | Davies et al. | 166/372 |
| 4,883,589 | 11/1989 | Konon | 210/170 |
| 4,892,664 | 1/1990 | Miller | 210/170 |
| 4,929,348 | 5/1990 | Rice | 210/170 |
| 4,950,394 | 8/1990 | Bernhardt et al. | 210/170 |
| 4,992,174 | 2/1991 | Caplan | 210/170 |

*Primary Examiner*—Bernard Nozick
*Attorney, Agent, or Firm*—Michael J. Striker

[57] ABSTRACT

An arrangement for driving out volatile impurities from a ground water and a ground region through which the ground water passes by introducing air or another gas into an opening in the ground region and subsequent aspiration of the air or the gas with entrained contamination substances, the contains a cup insert arranged to close an opening formed in a ground region at its lower end and provided with a closed wall, and two pipes arranged concentrically in the opening for supplying the air or gas and withdrawing the air or gas, respectively. The pipes include an inner pipe extending into an interior of the cup insert.

3 Claims, 1 Drawing Sheet

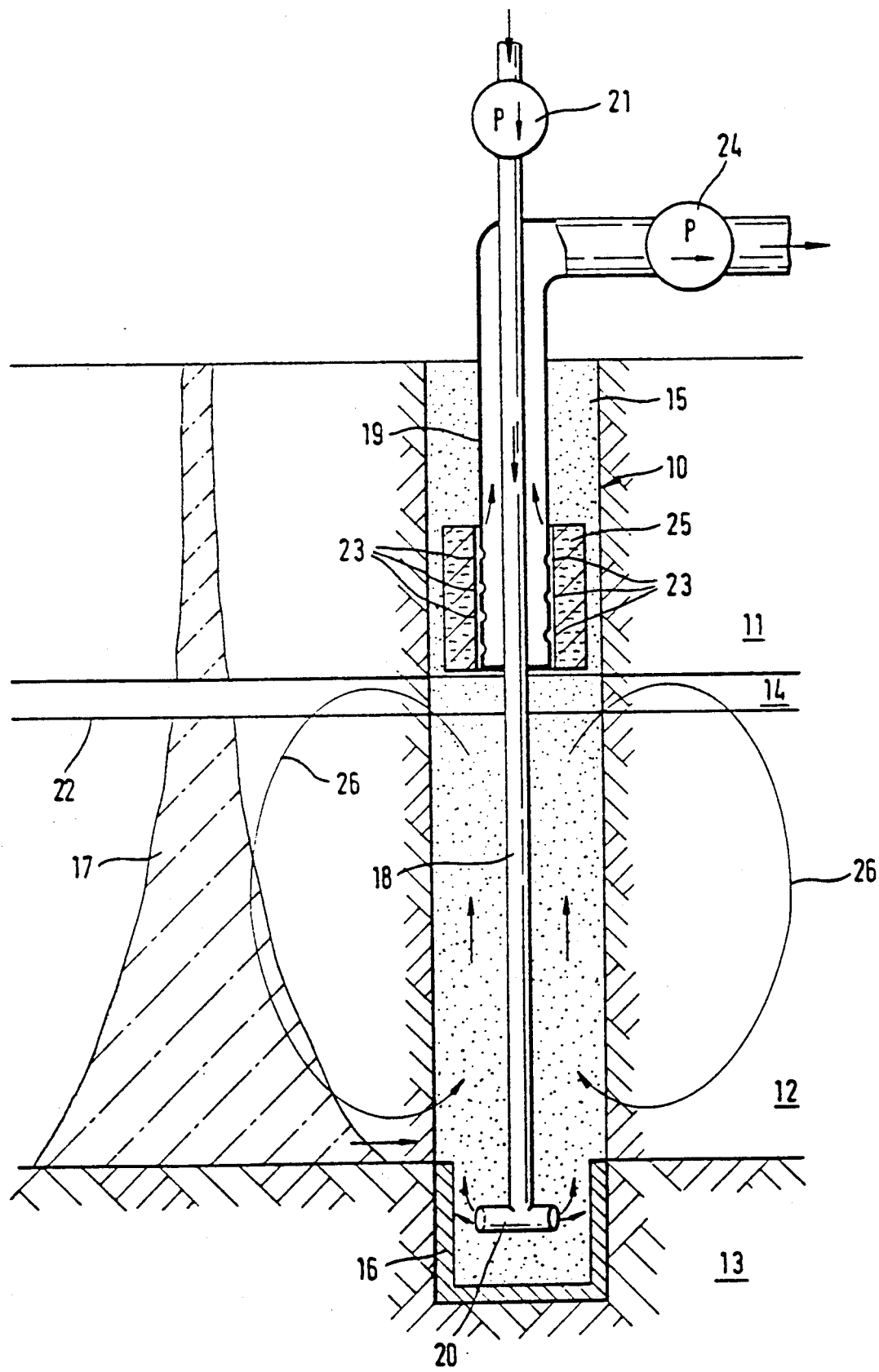

ARRANGEMENT FOR DRIVING OUT VOLATILE IMPURITIES FROM GROUND WATER

BACKGROUND OF THE INVENTION

The present invention relates to an arrangement for driving out volatile impurities from ground water and also from the ground region through which the ground water flows. More particularly, it relates to such an arrangement which operates by introducing air or other gases into an opening in the ground region and subsequent aspiration of the air with entrained contamination substances.

Arrangement of the above-mentioned general type are known in the art. The known arrangement for the purification of the ground water by pumping of air into it operates with two so-called ground lances which are introduced in two separate ground openings arranged at a distance from one another. One of the lances serves for introducing of air in the ground region, while the other ground lance has the function of aspirating the air. The air during its passage through the ground region entrains the volatile contamination substances and removes them from the ground region. The above mentioned arrangements have the disadvantage that by pumping of the gas into an opening, the impurities remain in the ground regions since the volatile gas cannot be again aspirated by the second ground lance. This disadvantage can not be eliminated by introducing several aspiration lances in the ground region. The total pumped air can not be again aspirated in any manner.

SUMMARY OF THE INVENTION

Accordingly, it is an object of the present invention to provide an arrangement for purification of ground water of the above mentioned general type, which avoids the disadvantages of the prior art.

More particularly, it is an object of the present invention to provide an arrangement for purification of ground water which operates with a higher efficiency and so that a scattering of impurities is prevented.

In keeping with these objects and with others which will become apparent hereinafter, one feature of the present invention resides, briefly stated, in an arrangement in which the opening is closed at its lower end by a closed-wall cup insert, and two concentrically arranged pipes for supply and withdrawal of a gas are introduced in the opening so that the inner pipe extends to the interior of the cup insert.

When the arrangement is designed in accordance with the present invention it eliminates the disadvantages of the prior art and provides the above mentioned advantages.

In accordance with another feature of the present invention, the inner pipe can be provided at its upper end with a regulatable pressure pump for introducing of fresh air or other gases into the opening and is also provided at its lower end with a distributor head with openings.

The distributor head insures horizontal air withdrawal in several spatial directions. The closed-walled cup insert in the lower opening region in which the introduced air discharges, operates for deviating the air stream in the vertical direction upwardly and prevents a lateral discharge of the air from the opening thereby horizontal scattering or dissipation of the contamination substances in the ground region.

The outer pipe of the above mentioned two concentric pipes can be provided at its upper end with a regulatable suction pump for aspirating the air or other gases. It preferably ends above the ground water level in the opening and its wall in the lower end region can be provided with perforations. Thereby the aspiration of the air or other gases is improved.

On the way from the lower opening end to the aspiration part the air binds the contamination substances contained in the ground water, and they finally are aspirated together with it. In the region of the perforations of the outer pipe, a double-casing mains filter can be arranged for initial coarse purification and also for the separation of water from air or other gases. The aspiration or pumping conduits for both pumps are preferably regulatable in correspondence with the receiving capacity of the opening as well as the ground property.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single Figure of the drawings is a view schematically showing an arrangement for driving out volatile impurities from ground water in accordance with the present invention.

DESCRIPTION OF THE PREFERRED EMBODIMENT

An arrangement for driving out volatile impurities from ground water operates in an opening 10 extending in a ground region 11 to be purified through a layer 12 which guides a ground water and to a water-impermeable layer 13. The layer 12 which guides the ground water is limited at its upper edge by a capillary wall 14 which is ground water-unsaturated. The opening 10 is filled with filter pebbles 15. The opening 10 is closed at its lower end with a cup insert 16 which has a closed wall. Near the opening 10 a contamination region identified with reference numeral 17 is located. This region extends conically downwardly and therefore extends in the area of influence of the cleaning arrangement in accordance with the present invention.

Two concentric pipes 18 and 19 are arranged in the center of the opening. The inner pipe 18 extends into the interior of the cup insert 16 and is closed there by a distributor head 20. A pressure pipe 21 for supplying of fresh air or other gases is arranged at the upper end of the pipe 18. The upper pipe 19 ends above a level of the ground water 21 in the opening 10 and is provided in its lower region with perforations 23. A suction pipe 24 is connected with an upper end of the outer pipe 19. A double-casing mains filter 25 is located in the opening 10 in the region of the perforations 23 of the outer pipe 19. It is used for cleaning the air or other gases and for separation of water.

Fresh air or another gas is supplied through the inner pipe 18 under the action of the pump 21 to the cup insert 16 of the opening 10 and flows through the distributor head 20 in a horizontal direction. The cup insert 16 deviates the horizontal air stream and forces the air to flow as a vertical stream upwardly. This movement is additionally reinforced by the pressure drop causes between the lower end of the opening 10 and the lower end of the suction pipe 19, under the action of the suction pump 24. During its upward movement through the ground water-saturated filter pebbles of the opening 10, the air loosens the volatile contamination substances from the ground water and transports them upwardly. The filter 25 which is arranged before the perforations 23 of the suction pipe 19, cleans the air and separates water from it, before the air is again transported by the pump 24 to the ambient atmosphere or an outer filter device. The vertical flow of the air or the gas in the opening from below upwardly simultaneously activates the vertical flow of the ground water in the surrounding ground region from above downwardly. Thereby not only a horizontal scattering of the contamination substances in the ground region is prevented but also a circulation of the ground water through the opening and therefore a higher efficiency is obtained. By the regulatable pumping output, the arrangement can easily be adapted to different properties, such as an opening diameter or a ground density. The arrangement therefore provides for an efficient and reliable cleaning process for all ground layers which guide the ground water.

It will be understood that each of the elements described above, or two or more together, may also find a useful application in other types of constructions differing from the types described above.

While the invention has been illustrated and described as embodied in an arrangement for driving out of volatile impurities from ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for driving out volatile impurities from a ground water and a ground region through which the ground water passes by introducing air or another gas into an opening in the ground region and subsequent aspiration of the air or the gas with entrained contamination substances, the arrangement comprising a cup insert arranged to close an opening formed in a ground region at its lower end and provided with a closed wall; two pipes arranged concentrically in the opening for supplying the air or gas and withdrawing the air or gas, respectively, said pipes including an outer pipe extending above a water level in the opening and having an upper end and a lower region, an inner pipe extending into an interior of said cup insert, said inner pipe having an upper end and a lower end; a pressure pump connected with said upper end of said inner pipe; a distributor head provided at said lower end of said inner pipe and having a plurality of openings; a suction pump connected with said upper end of said outer pipe, said outer pipe having a wall provided in said lower region and having a plurality of perforations.

2. An arrangement as defined in claim 1, and further comprising a double-casing mains filter arranged in the opening in the region of said wall of said outer pipe provided with said plurality of perforations.

3. An arrangement for driving out volatile impurities from a ground water and a ground region through which the ground water passes by introducing air of another gas into an opening in the ground region and subsequent aspiration of the air or the gas with entrained contamination substances, the arrangement comprising a cup insert arranged to close an opening formed in a ground region at its lower end and provided with a closed wall; two pipes arranged concentrically in the opening for supplying the air or gas and withdrawing the air or gas, respectively, said pipes including an inner pipe extending into an interior of said cup insert having a lower end and an upper end connected with a source of pressure, the outer pipe extending above a water level in the opening and having an upper end connected with a source of suction.

* * * * *